Nov. 25, 1969   HIDEO TATIBANA   3,480,132
APPARATUS FOR ARRANGING AMPULES IN REGULAR ORDER
Filed Feb. 6, 1968   4 Sheets-Sheet 1

INVENTOR
Hideo Tatibana

BY
Karl W Flocks
ATTORNEY

United States Patent Office 3,480,132
Patented Nov. 25, 1969

3,480,132
APPARATUS FOR ARRANGING AMPULES IN
REGULAR ORDER
Hideo Tatibana, 3–5, Nakano-6-chome, Nakano-ku,
Tokyo, Japan
Filed Feb. 6, 1968, Ser. No. 703,441
Claims priority, application Japan, Mar. 6, 1967,
42/13,737
Int. Cl. B65g 27/10
U.S. Cl. 198—220       1 Claim

ABSTRACT OF THE DISCLOSURE

The specification and drawings disclose apparatus adapted to automatically load a number of ampules which were successively set upright at random places on an inclined table, onto a running conveyor, in a row. The ampules slide downward on the inclined table, and are gradually and smoothly advanced through a suitable passage toward the conveyor without stagnating, by means of oscillating motion of a vibration plate which is positioned within a hole cut in the downstream portion of the table. Said smooth advancement of the ampules may be promoted by providing a projection having a polygonal transverse section swingable about an axis substantially perpendicular to a plane of said vibration plate above said plate.

The present invention relates to an apparatus for arranging a number of ampules in regular order, and particularly to an apparatus adapted to automatically load the ampules which were successively set upright at random places on an inclined supplying table, onto a running conveyor, in a row.

According to the present invention, there is provided an apparatus for arranging a number of ampules in regular order, comprising in combination a table fixed obliquely, a pair of inclined guide walls secured on said table which are converged toward the downstream direction to cooperate with each other at the downstream ends thereof to form a narrow passage therebetween having a width enough to permit the ampules to pass therethrough in a single row, a vibration plate positioned within a hole cut in the downstream portion of said table so that a vibration clearance may be left between said vibration plate and said cut-out hole and said plate has its upper surface substantially flush with the upper surface of said table, and an electromagnetic vibration means causing said vibration plate to vibrate.

According to the present invention, there is further provided the aforementioned apparatus in which a projection having a polygonal transverse section swingable about an axis substantially perpendicular to a plane of said vibration plate is provided on the upper face of said vibration plate adjacent said inclined guide walls leaving spaces of such amount as could allow one ampule after another ampule to pass through between said projection and said two guide walls, respectively.

Figure 1:
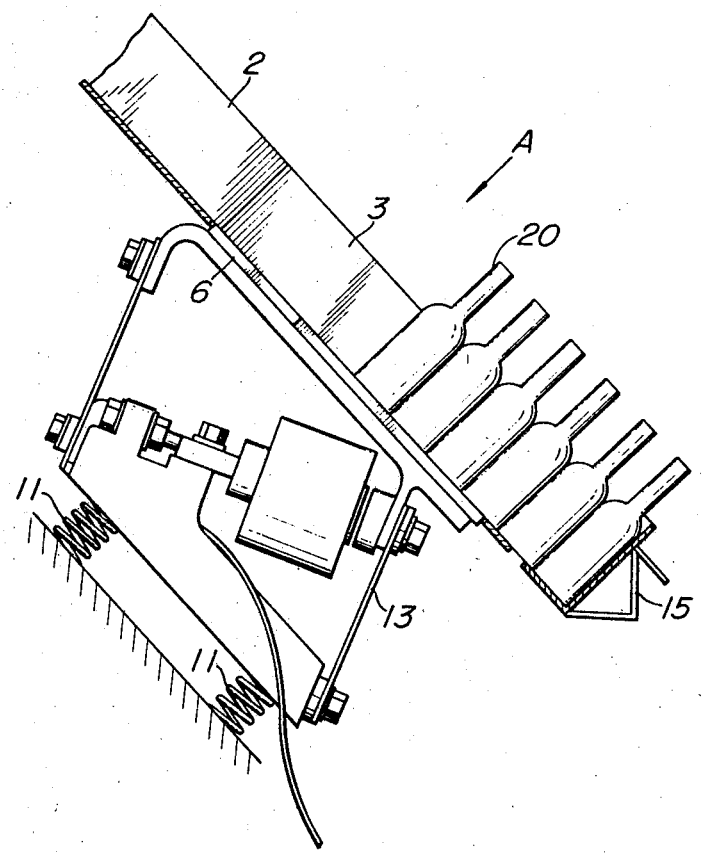
Figure 2:
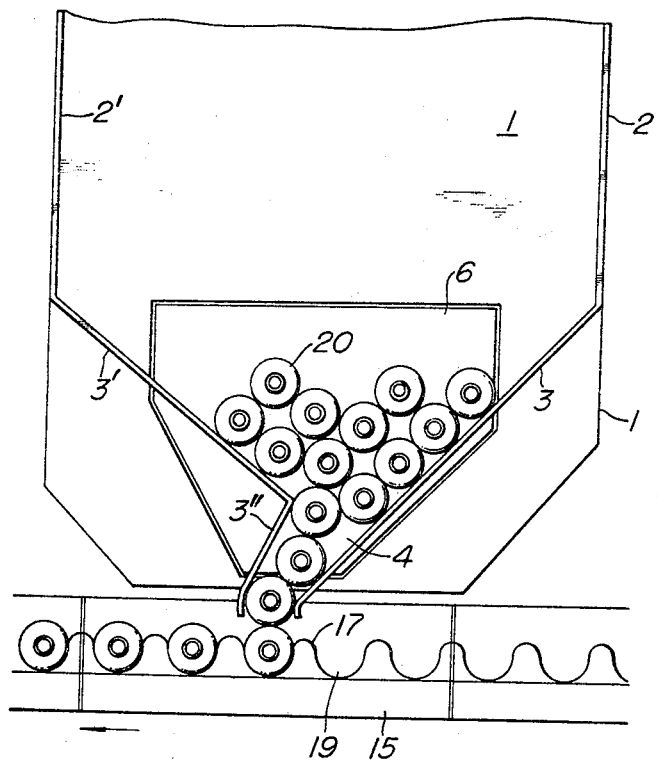
Figure 3:
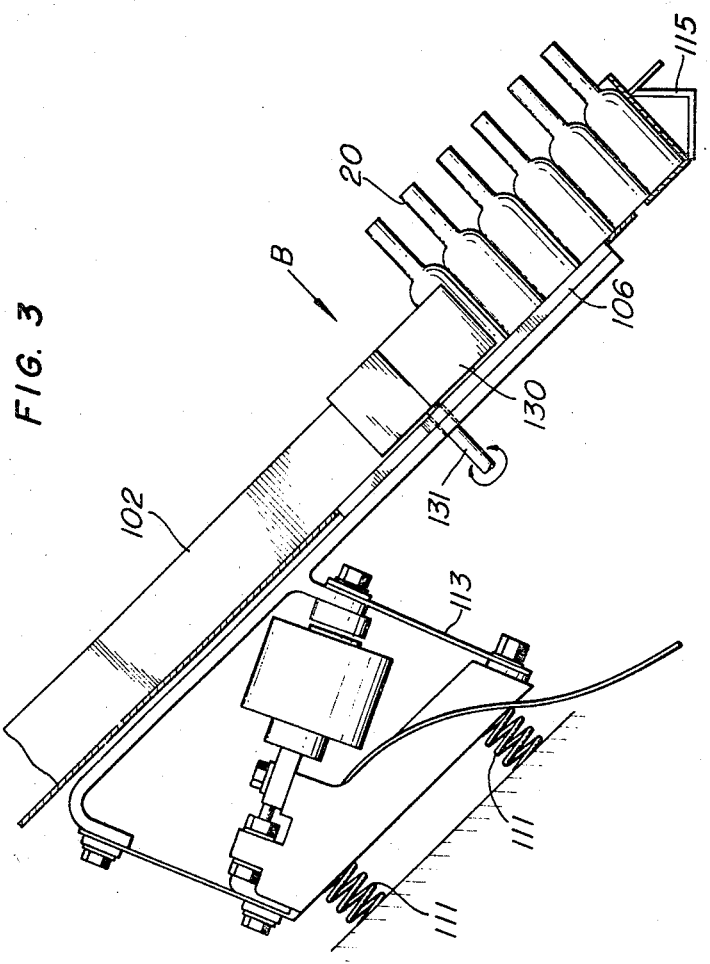
Figure 4:
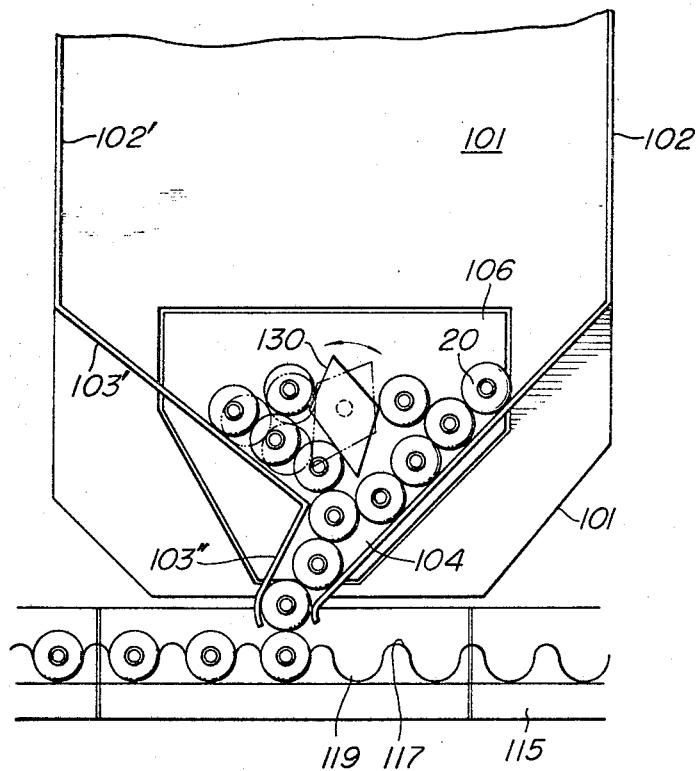

The above and other features of this invention will be made more apparent from the following description made in reference to the accompanying drawings which show source preferred embodiments of the invention, and in which:

FIG. 1 is a vertical cross sectional side view through a substantially longitudinal central axis of an embodiment of the present apparatus, FIG. 2 is a perspective top view as seen from the direction of an arrow A of the embodiment shown in FIG. 1, FIG. 3 is a view similar to that of FIG. 1, but showing a modified type of this apparatus including a rotating member therein, and FIG. 4 is a perspective top view as seen from the direction of an arrow B of the embodiment shown in FIG. 3.

In the first embodiment as shown in FIGS. 1 and 2, an ampule receiving table 1 is obliquely fixed. Two side walls 2, 2' are formed along the side edges of the table 1 on the upstream portion thereof least the ampules should drop down from the sides of the table. Said side walls 2, 2' are bent to get closer to each other to form inclined guide walls 3, 3'. One 3' of the guide walls is bent back at its downstream end 3'' to run substantially parallel to the other wall 3, so that said end 3'' will cooperate with said wall 3 to form a narrow passage 4 therebetween having a width enough to permit the ampules to pass therethrough in a single row. A suitable portion is cut out of the central downstream portion of said table 1. A vibration plate 6 having substantially the same configuration as said cut-out piece but slightly smaller than the latter is positioned within the cut-out hole so that a vibration clearance may be left between the vibration plate 6 and said cut-out hole and said plate may have an upper surface substantially flush with the surface of said table 1. As shown in FIG. 1, said vibration plate 6 is secured to and vibrated by an electromagnetic vibration means 13 which is supported on a suitable base through a plurality of springs 11.

A conveyor 15 may be positioned adjacent the outlet end of said passage 4 in a plane substantially perpendicular to the surface of the table 1. The conveyor has a plurality of ridges 17 formed thereon at substantially equal intervals and in a parallel relationship with one another. A plurality of grooves 19 for receiving the ampules are formed at substantially equal intervals between said ridges 17.

In operation, when a number of ampules 20 are successively set upright at random places on the upstream portion of the inclined table 1, they will slide downward on the inclined table and will reach on the vibration plate 6. By means of oscillating motion of said plate 6 caused by the electromagnetic vibration means 13, the ampules 20 which have reached on said plate 6 may vibrate all the time, and may enter progressively and smoothly into said passage 4 without stagnating on said plate 6. Lastly, the ampules having passed through the passage 4 may fall one by one into said grooves on the running conveyor 15, by which the ampules may be transferred to a succeeding processing station such as filling station where the ampules are to be filled with a liquid medicine.

The second embodiment of the present invention is illustrated in FIGS. 3 and 4, and is generally similar to that of FIGS. 1 and 2 In the embodiment of FIGS. 3 and 4, like parts carrying similar reference numerals, in which 100 is added to the corresponding numerals in FIGS. 1 and 2, will not be described again in connection with the second embodiment.

The arrangement of FIGS. 3 and 4 contains a projection 130 having a rhombic transverse section which is swingable clockwise and anticlockwise about an axis of a shaft 131 secured thereto passing through the vibration plate 106, said projection 130 being positioned adjacent two inclined guide walls 103, 103' leaving spaces of such amount as could allow one ampule to readily pass through between said projection 130 and said two guide walls 103, 103', respectively. The projection 130 is of substantially the same height as the guide walls 103, 103'.

It will be readily understood that the aforementioned arrangement results in that as the ampules closing up around said projection 130 are shaken by the swing motion thereof about the axis of said shaft 131, a stagnation of said ampules can be more effectively prevented than in the first embodiment of FIGS. 1 and 2, and therefore the second embodiment of FIGS. 3 and 4 is more suitable for the treatment of the ampules on the outer surface of which large coefficient of friction has been imposed as caused by the preliminary processes such as washing and heating.

What is claimed is:

1. An apparatus for arranging a number of ampules in regular order, comprising in combination a table fixed obliquely, a pair of inclined guide walls secured on said table which are converged toward the downstream direction to cooperate with each other at the downstream ends thereof to form a narrow passage therebetween having a width enough to permit the ampules to pass therethrough in a single row, a vibration plate positioned within a hole cut in the downstream portion of said table so that a vibration clearance may be left between said vibration plate and said cut-out hole and said plate has its upper surface substantially flush wih the upper surface of said table, an electromagnetic vibration means causing said vibration plate to vibrate, a projection having a polygonal transverse section swingable about an axis substantially perpendicular to a plane of said vibration plate provided on the upper face of said vibration plate adjacent said inclined guide walls leaving spaces of such amount as could allow one ampule after another ampule to pass through between said projection and said two guide walls, respectively.

References Cited

UNITED STATES PATENTS

| 1,545,376 | 7/1925 | Weatherby. | |
| 2,696,285 | 12/1954 | Zenlea | 221—200 X |

FOREIGN PATENTS 1,475,759  2/1967  France.

STANLEY H. TOLLBERG, Primary Examiner